(12) United States Patent
Deutscher et al.

(10) Patent No.: US 10,190,498 B1
(45) Date of Patent: Jan. 29, 2019

(54) VALVE WITH VALVE MEMBER COOLING

(71) Applicant: JANSEN'S AIRCRAFT SYSTEMS CONTROLS, INC., Tempe, AZ (US)

(72) Inventors: Kevin W. Deutscher, Phoenix, AZ (US); Todd M. Meyer, Mesa, AZ (US); Rickie P. Western, Gold Canyon, AZ (US)

(73) Assignee: JANSEN'S AIRCRAFT SYSTEMS CONTROLS, INC., Tempe, AZ (US)

( * ) Notice: Subject to any disclaimer, the term of this patent is extended or adjusted under 35 U.S.C. 154(b) by 136 days.

(21) Appl. No.: 15/213,952

(22) Filed: Jul. 19, 2016

Related U.S. Application Data (60) Provisional application No. 62/196,834, filed on Jul. 24, 2015.

(51) Int. Cl.
| | | |
|---|---|---|
| *F16K 49/00* | (2006.01) | |
| *F02C 7/12* | (2006.01) | |
| *F02C 7/232* | (2006.01) | |
| *F02C 9/52* | (2006.01) | |
| *F23R 3/04* | (2006.01) | |
| *F16K 11/07* | (2006.01) | |
| *F16K 31/122* | (2006.01) | |

(52) U.S. Cl.
CPC ............... *F02C 7/12* (2013.01); *F02C 7/232* (2013.01); *F02C 9/52* (2013.01); *F16K 11/0716* (2013.01); *F16K 31/1221* (2013.01); *F16K 49/005* (2013.01); *F16K 49/007* (2013.01); *F23R 3/04* (2013.01); *F05D 2220/32* (2013.01); *F05D 2240/35* (2013.01); *F05D 2260/20* (2013.01); *Y10T 137/6579* (2015.04)

(58) Field of Classification Search
CPC ............. Y10T 137/6579; F16K 49/005; F16K 49/007; F02C 7/12; F02C 7/232
See application file for complete search history.

(56) References Cited

U.S. PATENT DOCUMENTS

| 434,867 A | * | 8/1890 | Hanlon | F16K 49/007 |
| | | | | 137/340 |
| 2,994,338 A | * | 8/1961 | Wilson | F16K 49/007 |
| | | | | 137/340 |
| 3,259,143 A | * | 7/1966 | Powell | F16K 49/007 |
| | | | | 137/340 |
| 3,710,810 A | * | 1/1973 | Shiraki | F16K 49/007 |
| | | | | 137/1 |

(Continued)

*Primary Examiner* — Kevin Murphy
(74) *Attorney, Agent, or Firm* — Klintworth & Rozenblat IP LLP (57) ABSTRACT

A valve member cooling arrangement for a valve having at least one housing with sets of working fluid inlet/outlet ports and coolant supply/return ports. A valve member movably disposed within a valve chamber has a valve head configured to control flow between the working fluid ports. The valve member has valve member inlet/outlet openings and defines an internal valve member cooling passage uniting the valve openings. At least one coolant sleeve is disposed about the valve member. The coolant sleeve(s) have inflow and outflow ports separated inflow from outflow by at least one seal. During static and dynamic positioning of the valve member, the valve member inlet(s) are in communication with inflow port(s) of the coolant sleeve, and the valve member outlet(s) are in communication with outflow port(s) of the coolant sleeve(s).

20 Claims, 7 Drawing Sheets

(56) References Cited

U.S. PATENT DOCUMENTS

| | | | | |
|---|---|---|---|---|
| 3,831,622 | A | * | 8/1974 | Grewer ................. F16K 49/007 |
| | | | | 137/340 |
| 3,848,665 | A | * | 11/1974 | Uerlichs ................... C21B 9/12 |
| | | | | 165/168 |
| 6,050,081 | A | | 4/2000 | Jansen et al. |
| 7,527,068 | B2 | | 5/2009 | Jansen |
| 7,874,310 | B1 | * | 1/2011 | Jansen .................... F01D 25/12 |
| | | | | 137/340 |

* cited by examiner

VALVE WITH VALVE MEMBER COOLING

CROSS-REFERENCE TO RELATED APPLICATION(S)

This application claims benefit to U.S. provisional application No. 62/196,834, filed Jul. 24, 2015.

STATEMENT OF FEDERALLY SPONSORED RESEARCH OR DEVELOPMENT

Not applicable.

FIELD OF THE DISCLOSURE

This disclosure relates to valves, including valves for controlling the flow of fuel and purge air to gas turbines.

BACKGROUND OF THE DISCLOSURE

Gas turbine engines employ a set of rotating turbine blades to compress air leading to a combustion chamber into which fuel is injected and ignited. The hot gases from combustion turn a downstream set of blades from which energy is extracted and which are also typically connected to a common shaft to turn the compressor blades. Fuel is delivered to metering orifices in the combustion chamber under pressure through one or more fuel lines.

While the turbine is operating, the fuel in the system is burnt. However, residual fuel in the system after turbine shut-down can lead to the common problem of "coking" in which the elevated system temperatures just after shut-down may burn off the volatile components of the hydrocarbon fuel and leave behind a carbonaceous solid deposit or tar. Coking may be particularly problematic in sensitive areas of flow control, such as at the metering orifices where flow metering is performed and sealing is achieved. To reduce, or possibly eliminate, coking, conventional turbines have a purge system in which hot air from the compressor section is directed through the fuel-carrying components of the system to evacuate residual fuel after shut-down.

U.S. Pat. No. 6,050,081, assigned to the assignee of this disclosure, and incorporated by reference herein in its entirety, presented a marked improvement in the manner in which the purge air and fuel systems were united and controlled in order to allow purging of the fuel system without intermixing the air and fuel streams. More specifically, a single 3-way spool valve arrangement to control both the fuel shut off and checking the fuel flow during purge operation was used in place of numerous discrete components (e.g., flow cut-off and check valves), the accumulation of coking of critical features, and thus failure points and pressure drops in the fuel system, was reduced.

Yet, the rather ubiquitous problem of coking may still develop in the valve if the temperatures are elevated near or above the coking threshold temperature of the fuel. For example, high temperature purge air may cause a rise in the temperature of the adjacent valve member, which is also acting to check the fuel flow during purging. Coking on or around either the valve member or the valve seat may thus sill occur under certain circumstances.

SUMMARY OF THE DISCLOSURE

A valve and valve member cooling arrangement are disclosed. In certain embodiments, the valve may be suitable for use in large-scale turbine applications to control the flow of liquid fuel and hot purge air to the turbine combustors, while helping to avoid or reduce the presence and effects of coking.

According to one aspect of the disclosure a valve with a valve member cooling arrangement includes at least one housing having at least one set of working fluid inlet and outlet ports and at least one set of coolant supply and return ports. The at least one housing has a valve chamber at least in part disposed within a flow path from the at least one working fluid inlet port to the at least one working fluid outlet port. A valve member is movably disposed within the valve chamber and has a valve head configured to control flow between the at least one set of working fluid inlet and outlet ports. The valve member has at least one valve member inlet and at least one valve member outlet and defines an internal valve member cooling passage uniting the at least one valve member inlet and outlet ports. During static and dynamic positioning of the valve member, the at least one valve member inlet is in communication with the at least one coolant supply port, and the at least one valve member outlet is in communication with the at least one coolant return port.

In another aspect of the disclosure, a valve with a valve member cooling arrangement includes at least one housing having at least one set of working fluid inlet and outlet ports and at least one set of coolant supply and return ports. The at least one housing has a valve chamber at least in part disposed within a flow path from the at least one working fluid inlet port to the at least one working fluid outlet port. A valve member is movably disposed within the valve chamber and has a valve head configured to control flow between the at least one set of working fluid inlet and outlet ports. The valve member has a first part defining a post extending along a stroke axis of the valve member and a second part defining a cavity extending along the stroke axis receiving the post of the first part. The first part defines a first part of a valve member cooling passage running from at least one valve member inlet of the valve member through the post to a post opening in communication with the cavity of the second part. At least one of the post and the cavity has a cross-section that varies, at least in part, along the stroke axis so as to define a second part of the valve member cooling passage running to at least one valve member outlet of the valve member. During static and dynamic positioning of the valve member, the at least one valve member inlet is in communication with the coolant supply port.

In yet another aspect of the disclosure, a valve with a valve member cooling arrangement includes at least one housing having at least one set of working fluid inlet and outlet ports and at least one set of coolant supply and return ports. The at least one housing has a valve chamber at least in part disposed within a flow path from the at least one working fluid inlet port to the at least one working fluid outlet port. A valve member is movably disposed within the valve chamber and has a valve head configured to control flow between the at least one set of working fluid inlet and outlet ports. The valve member has at least one valve member inlet and at least one valve member outlet and defines an internal valve member cooling passage uniting the at least one valve member inlet and outlet ports. An inlet coolant sleeve is disposed in the at least one housing and has an opening about the stroke axis receiving the valve member and has at least one inflow port. An outlet coolant sleeve is disposed in the at least one housing along the stroke axis proximate to the inlet coolant sleeve and has an opening about with the stroke axis receiving the valve member and has at least one outflow port. An annular seal is disposed about the stroke axis to seat against the valve member and isolate the at least one inflow port from the at least one outflow port.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed valve and valve member cooling arrangement, as shown in the accompanying figures of the drawings described briefly above. Various modifications to the example embodiments may be contemplated by one of skill in the art.

From one perspective, the disclosure provides a cooling arrangement in which the active valve member itself is cooled, rather than merely areas of the valve that are near to, or surrounding, the valve chamber. Coolant is instead directed into the valve member and along significant portions or features of the valve member, for example, along the length of the valve member, including the valve head or spool portion of the valve member.

Cooling the valve member itself, especially in addition to cooling other areas of the valve, allows the valve to better resist the formation of coking on or around the valve member, such as at areas critical to a flow control operation of the valve. For example, cooling the valve member can help reduce the presence or formation of coke deposits on the valve member itself, such as at the valve head of the valve member, as well as at the valve seat or surrounding areas, such as on one or more valve seals against which the valve head seats.

In other respects, the disclosure provides example constructions for achieving direct cooling of the moving valve member. In certain embodiments, for example, the valve member may be a multi-piece assembly with a female part that inter-fits with a male part and defines a cooling flow passage therebetween. Valve member inlets and outlets may be provided in one or more of the valve member parts to allow coolant to flow into and out of the valve member. In certain embodiments, the male part of the valve member may have an inlet or multiple inlets in communication with one or more coolant supply ports of the valve, and the female part may have an outlet or multiple outlets in communication with one or more coolant return ports. In certain other embodiments, the female part may also define the valve head (e.g., a spool) of the valve member and a bore or cavity extending about and along the stroke axis of the valve member. The male part may also define a post-like feature with an internal flow passage leading from the valve member inlet(s) and to an opening that leads to the bore of the female part. The post may have an non-uniform outer surface or cross-sectional profile so that spacing, voids or other pathways are created in the radial areas between the male and female parts, which are in communication with the valve member outlet(s). It will be understood, of course, that the features of the male and female parts could be reversed from that just described.

In yet other embodiments, one or more coolant sleeves, such as a supply sleeve and a return sleeve, may be arranged along the stroke axis and isolated by one or more seals, such as annular seals, which dynamically seal against the valve member. The supply sleeve may have one or more inflow ports in communication with the valve member inlet(s), and the return sleeve may have one or more outflow ports in communication with the valve member outlet(s), the inflow ports communicating with the coolant supply port(s) and the outflow ports communicating with the coolant return port(s).

From another perspective, the disclosure provides an improved valve for segregating and controlling flow of multiple working fluid streams. In addition to the coolant supply and return ports, the valve may have two or more sets of working fluid inlet and outlet ports. For example, the valve may be used in turbine fuel control applications in which the valve has fuel inlet/outlet ports for fuel flow and purge air inlet/outlet ports for purge air flow. As understood, in such applications, it is important for the fuel and purge air streams to remain separate (i.e., not mix) during operation of the turbine. The disclosed valve may be have a pair of main flow control seals against which the valve head of the valve member seat alternatively to close off either the fuel flow or the purge air flow, while the other is flowing. The presence or occurrence of coking in such a valve arrangement, and in such a turbine application in which relatively hot compressor section air is supplied to the purge air inlet(s), may be significantly reduced or eliminated at the flow control areas of the valve by cooling the valve member, as mentioned above.

Figure 1:
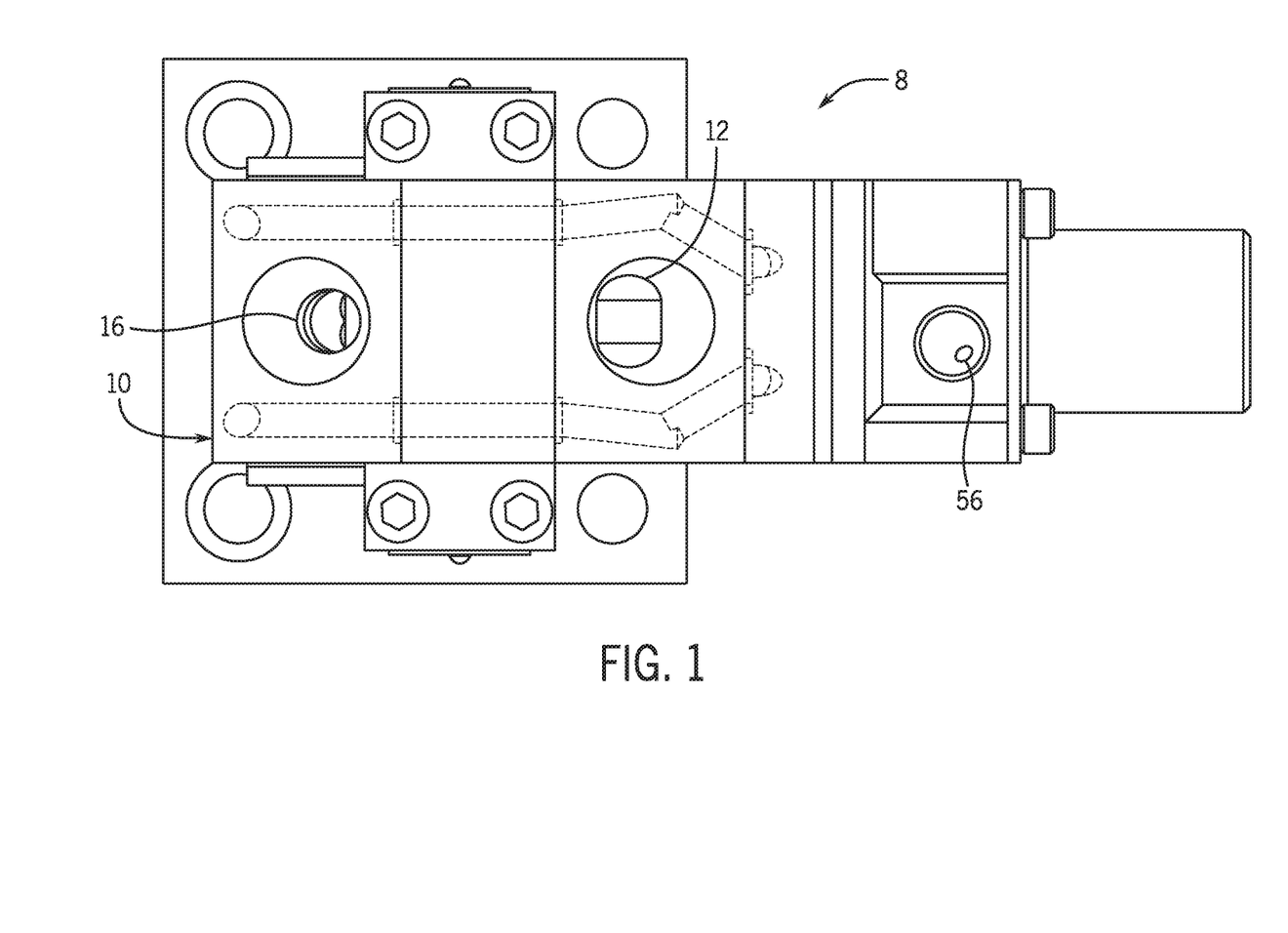
FIG. 1 is a cross-sectional top view of an example valve having a valve member cooling arrangement according to the present disclosure.
Figure 2:
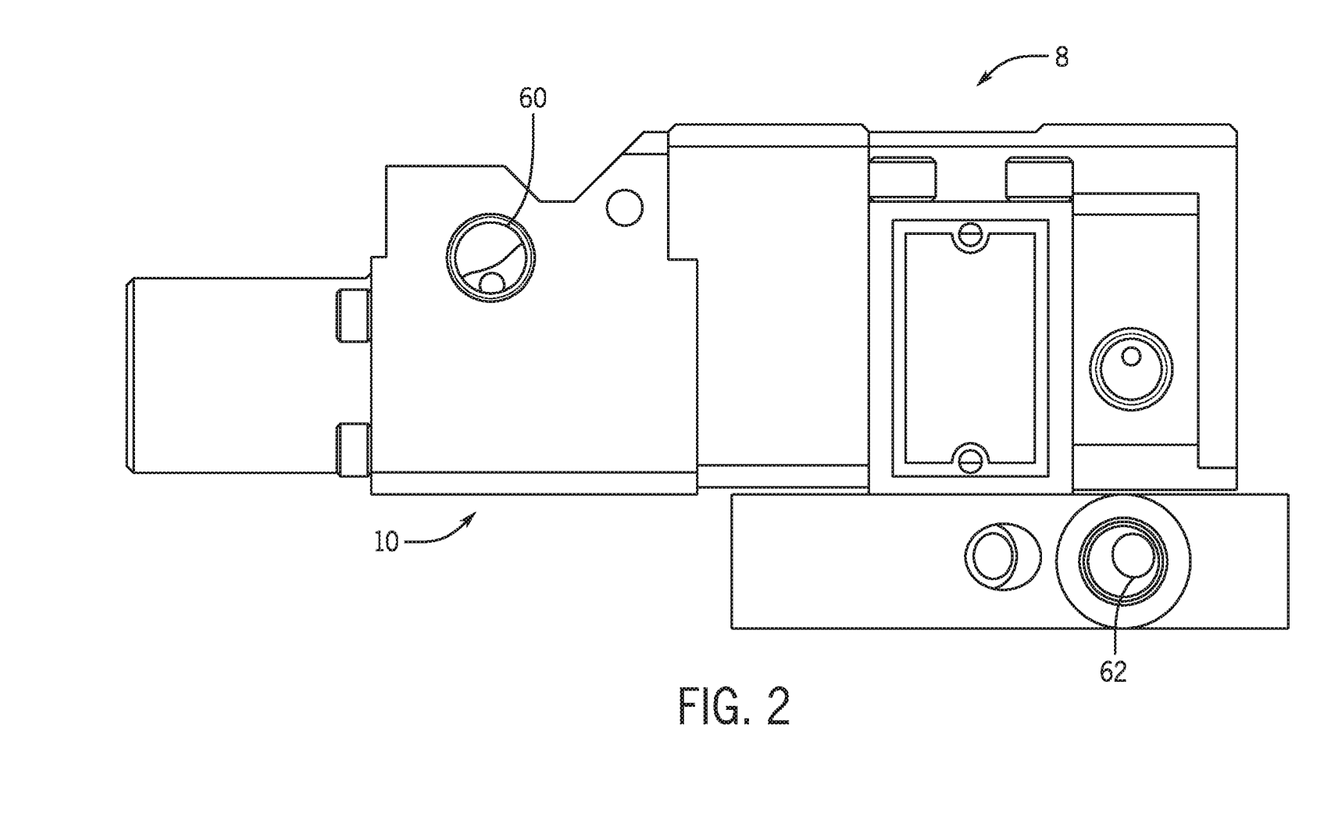
FIG. 2 is a side view thereof.
Figure 3:
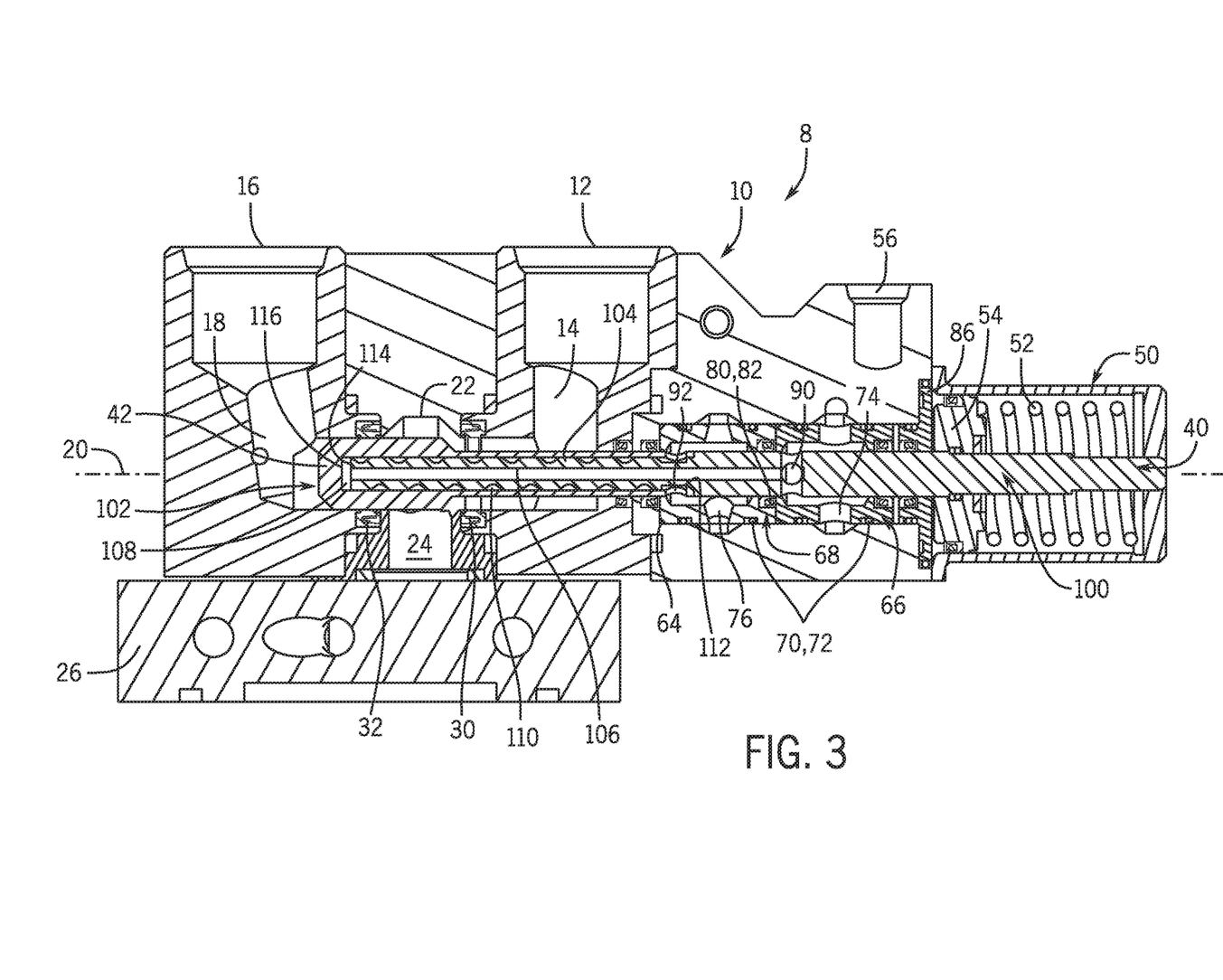
FIG. 3 is a cross-sectional side view thereof.

Referring now to FIGS. 1-3, an example control valve 8 with a valve member cooling arrangement has a housing 10, which may have one or more individual housings or housing sections with suitable seals or gaskets (e.g., crush gaskets) between interfaces to control leakage. The housing 10 may have a purge air inlet port 12 leading to a purge air channel 14 and a fuel inlet port 16 leading to a fuel channel 18. Both the purge air channel 14 and the fuel channel 18 extend along a stroke axis 20 and are separated at opposite sides of a valve chamber 22 which leads to an outlet port 24 common to both the purge air 12 and fuel 16 inlet ports. The fuel inlet port 16 may be coupled by appropriate fittings (not shown) to a fuel pump or pressurized supply tank of a fuel system (not shown), and the purge air inlet port 12 may be coupled by appropriate fittings (not shown) to a source of air, such as the compressor section of a turbine (not shown), to provide a source of hot (e.g., 400° Fahrenheit) air for purging the control valve 10. The outlet port 24 may be coupled through porting in a mounting flange 26 and/or appropriate fuel lines (not shown) to a combustion chamber of the turbine.

A first annular seal 30 separates the purge air channel 14 from the outlet port 24, and a second annular seal 32 separates the outlet port 24 from the fuel channel 18. The annular seals may be centered about the stroke axis 20 and have identical internal diameters.

An elongated valve member 40 may be in the form of a spool valve, which has a generally cylindrical body and an enlarged valve head 42 at one end, which may be essentially equal in diameter to the internal diameter of the annular seals 30, 32 so as to prevent flow through the seals 30, 32 when the valve head 42 is within either or both of the seals 30, 32. The valve member 40 may move along the stroke axis 20, and the valve head 42 may extend along the stroke axis 20 by a distance greater than the axial separation between the annular seals 30, 32 so that both seals 30, 32 may be blocked by the valve head 42 and at no time is more than one seal 30 or 32 open. On either side of the valve head 42 along the stroke axis 20, the valve member 40 may neck down to a narrower outside dimension and may extend into the purge air channel 14 and the fuel channel 18, respectively.

From the valve head 42, the valve member 40 may have a narrowed, generally cylindrical elongated body. At the end of the valve member opposite the valve head 42 is an actuator assembly 50, that may be pilot air actuated and spring returned. Specifically, a helical compression spring 52 disposed about the valve member 40 may act against an enlarged piston 54, which is also disposed about and coupled to the valve member 40, such as by a pin and slot connection. The spring 52 may bias the valve member 40 toward the fuel channel 18 so that the valve head 42 closes the seal 32 and normally shuts off the fuel flow and open the purge air flow. The actuator piston 54 may be activated by a source of compressed air (not shown) through a pilot air inlet 56 in the housing 10 to move the valve member 40 along the stroke axis 20 in the opposite direction. The pressure of the air supplied through the pilot air inlet 56 is sufficient, acting on the large area of the actuator piston 54, to counter the spring force as well as any frictional forces and residual purge air pressure, and move the valve member 40 toward the purge air channel 14 sufficient to engage the valve head 42 with seal 30 and disengage the valve head 42 from the seal 32 so as to close seal 30 and open seal 32, respectively. In the turbine context, prior to pressurization of the fuel by the fuel pump to pass through fuel inlet channel 16 or after fuel pressure has stopped when it is desired to shut down the turbine, the valve member 40 may be biased fully toward the fuel channel 18 to block seal 32 and thereby prevent fuel from reaching the outlet port 24. This biasing is by the spring 52 as well as by the pressure exerted on the valve head 42 by the purging air in the purge air channel 14. In this way, the valve 10 exhibits a positive shut off with biasing forces tending to overcome typical frictional forces, such as arising from a small amount of coking.

Again, the axial dimension of the valve head 42 is such that the seal 30 may be completely blocked prior to seal 32 being opened so as to prevent the possibility of heated combustion gases passing into the fuel channel 18, which, among other things, may interfere with proper operation of the valve 8 and flow of fuel to the turbine. Coking may also tend to arise under such conditions. The dimensions of the valve head 42 and the force of the spring 52 are selected such that at typical pressures of the fuel through fuel inlet port 16 and expected pressures of the purging air through purge air inlet port 12, the valve member 40 will normally be in the purge air position (left-most position in FIG. 3). Pilot air is thus required to change the position of the valve member 40 to the fuel position (right-most position in FIG. 3), and thus to initially deliver fuel to the turbine. However, once full fuel pressure is achieved, the spring force may be insufficient to close seal 32. In this way, a loss of pilot pressure would not interrupt turbine operation so long as there is fuel pressure. When fuel pressure is lost, the valve member 40 will return to its left-most position sealing the seal 32, which provides an effective check valve against backflow into the fuel channel 16.

In certain configurations, the control valve 8 may be capable of operating as a 3-way or 3-position valve. For example, when the constant diameter section of the valve head 42 has a length dimension (i.e., a dimension along the stroke axis 20) that is equal or greater to the spacing between the annular seals 30, 32, then the valve member 40 may be controlled to position the valve head 42 into one of three primary positions along the stroke axis 20. Specifically, the valve member 40 may be positioned into a first position along the stoke axis 20 in which the valve head 42 may close the annular seal 32 while allowing purge air past the annular seal 30. The valve member 40 may be moved to a second position along the stroke axis 20 in which the valve head 42 may close the annular seal 30 while allowing fuel past the annular seal 32. Last, the valve member 40 may be moved into a third, intermediate position along the stroke axis 20 in which the valve head 42 my close both of the annular seals 30, 32, thus preventing both fuel and purge air flow.

Having described 3-way operation of the valve member in an example configuration of the control valve 8, an example valve member cooling arrangement will now be described. The housing 10 may have coolant supply 60 and return 62 ports through which coolant, such as a suitable liquid coolant, is circuited. Within the pathway between the supply 60 and return 62 ports, the housing 10 may form an internal chamber 64 in which may be disposed one or more sleeves, such as supply sleeve 66 and return sleeve 68. The sleeves 66, 68 may be identical and arranged side-by-side long the stroke axis 20 within the internal chamber 64. O-rings 70 or other seals may be set in circumferential grooves 72 in the sleeves 66, 68 on each side of inflow 74 and outflow 76 ports, respectively. One or more inflow 74 and outflow 76 ports may be aligned with enlarged annular portions of the internal chamber 64 which allow passage of coolant to and from, respectively, the supply 60 and return 62 ports. Other seals 80, such as annular seals configured to dynamically seal against the outer surface of the valve member 40, may isolate the coolant from the pilot air and the purge air streams. One or more of the seals 80 may be set into recesses 82 in the ends of the sleeves 66, 68, with the seal 80 in the recess 82 in the return sleeve 68 serving to isolate the supply coolant flow from the return coolant flow within the sleeves 66, 68. An end plate 86, also mounted about the valve member 40 and sealed with the housing 10, may isolate the internal chamber 64, and the sleeves 66, 68, from the actuator assembly 50. Further, the valve member 40 may be configured with one or more inlets 90 and outlets 92, which allow coolant to flow into and out of, respectively, the valve member 40.

Figures 4A, 4B:
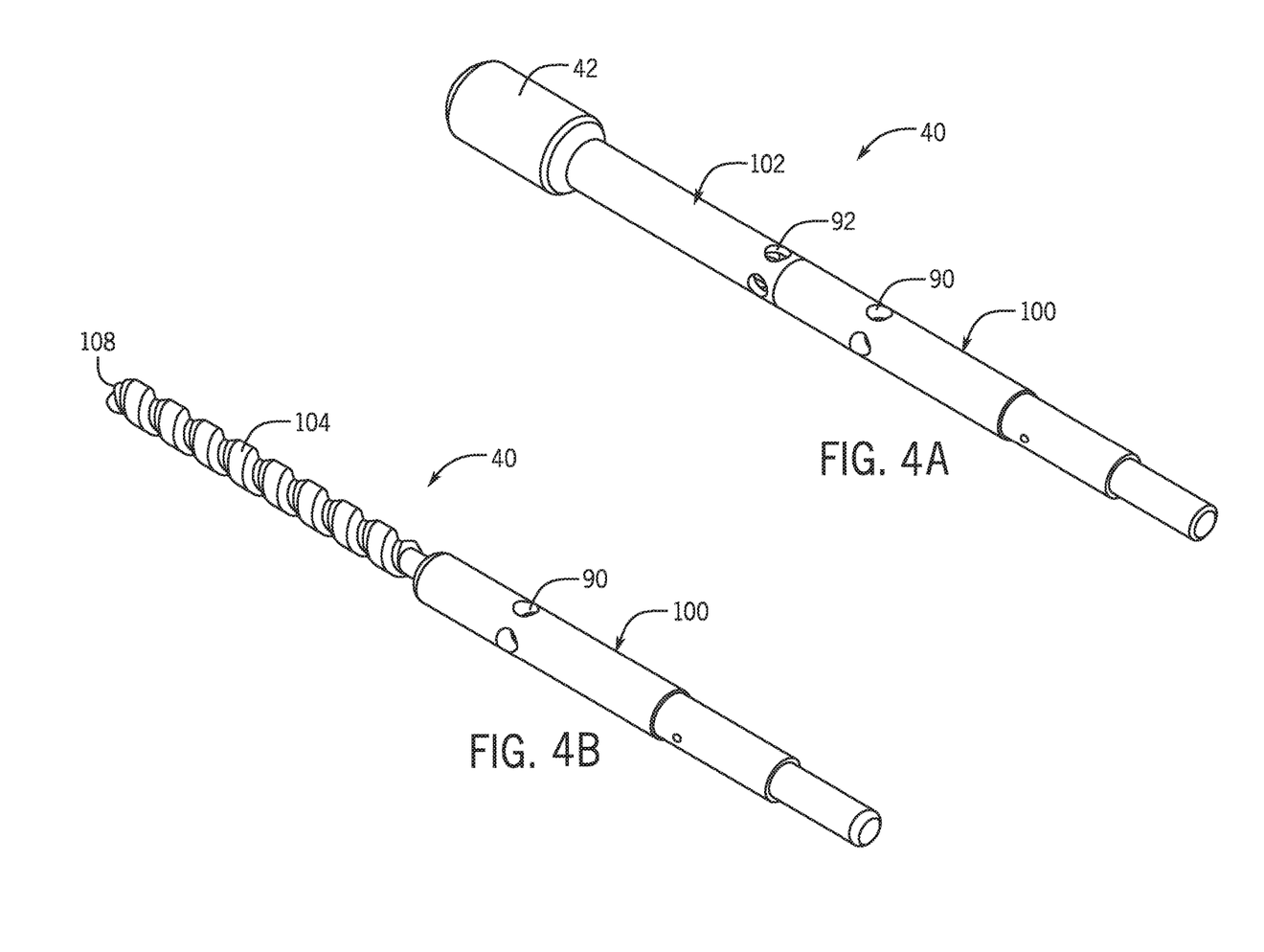
FIGS. 4A and 4B are isometric views of an example valve member thereof, FIG. 4B shown without a second part defining a valve head of the valve member.

Referring also to FIGS. 4A and 4B, in the illustrated example, the valve member 40 has a multi-piece configuration. Specially, the example valve member 40 is made of two parts, generally a male component 100 and a female component 102. As shown, the male component 100 may form the tail of the valve member 40 that interfaces with the actuator piston 54 and spring 52. At its opposite end, the male component 100 may for a narrowed (e.g., reduced diameter) elongated post 104. The post 104 may have an internal flow passage 106 that runs from the valve member inlet(s) 90 the length of the post 104 and opens at a radial end face 108 of the post 104. The outer surface of the post 104 may be shaped or otherwise configured to have a varied cross-sectional profile, such the single helix, spiral configuration shown.

Figure 5A:
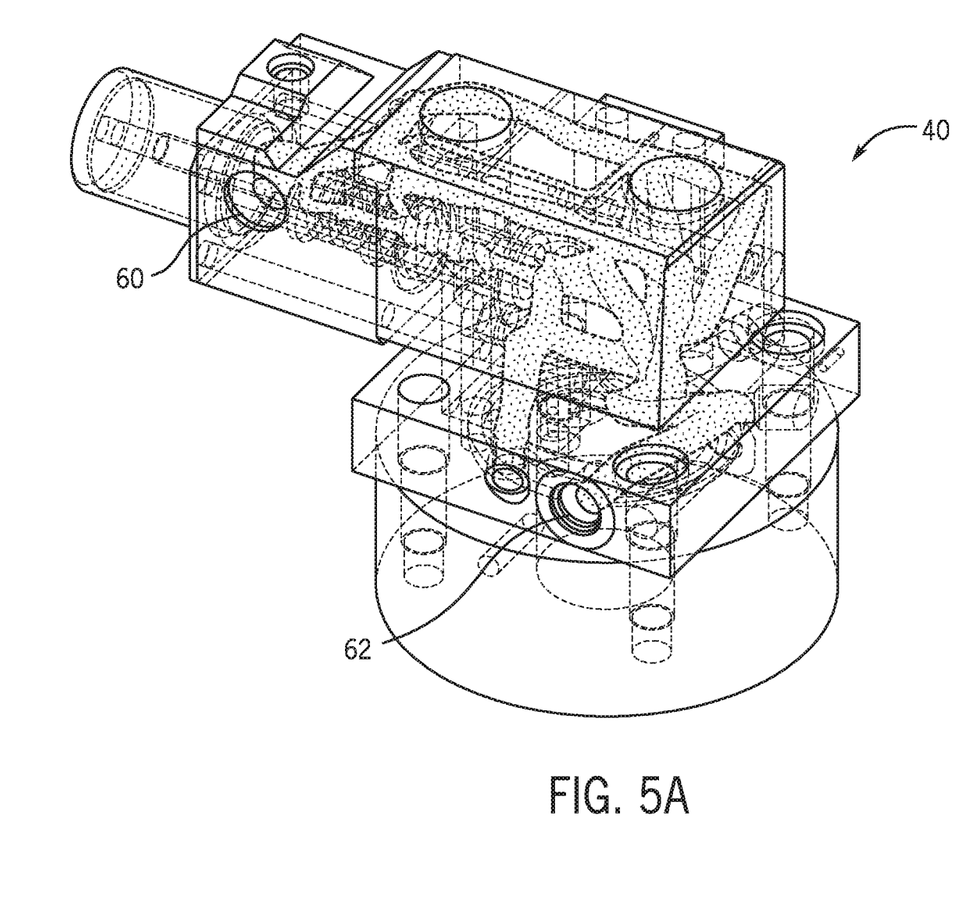
FIGS. 5A-5C are isometric, top and side views, respectively, of thereof with showing a tracing of an example coolant flow path through the valve.
Figure 5B:
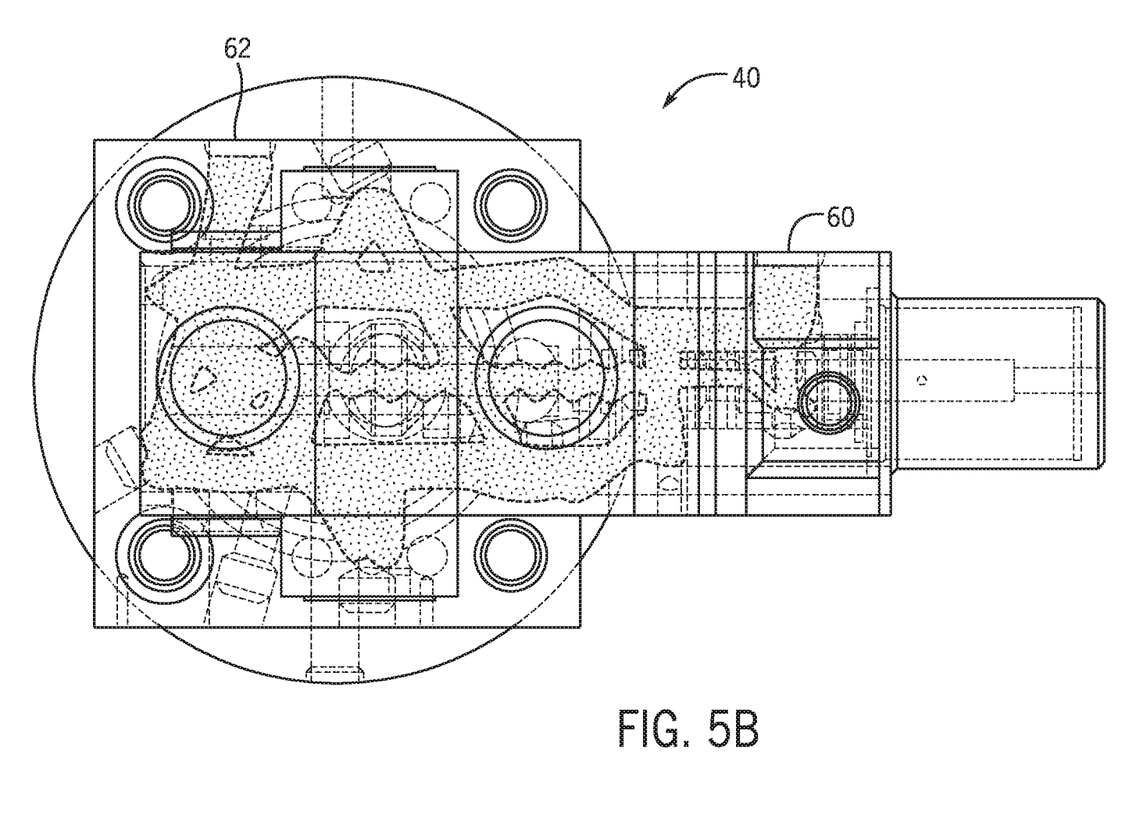
Figure 5C:
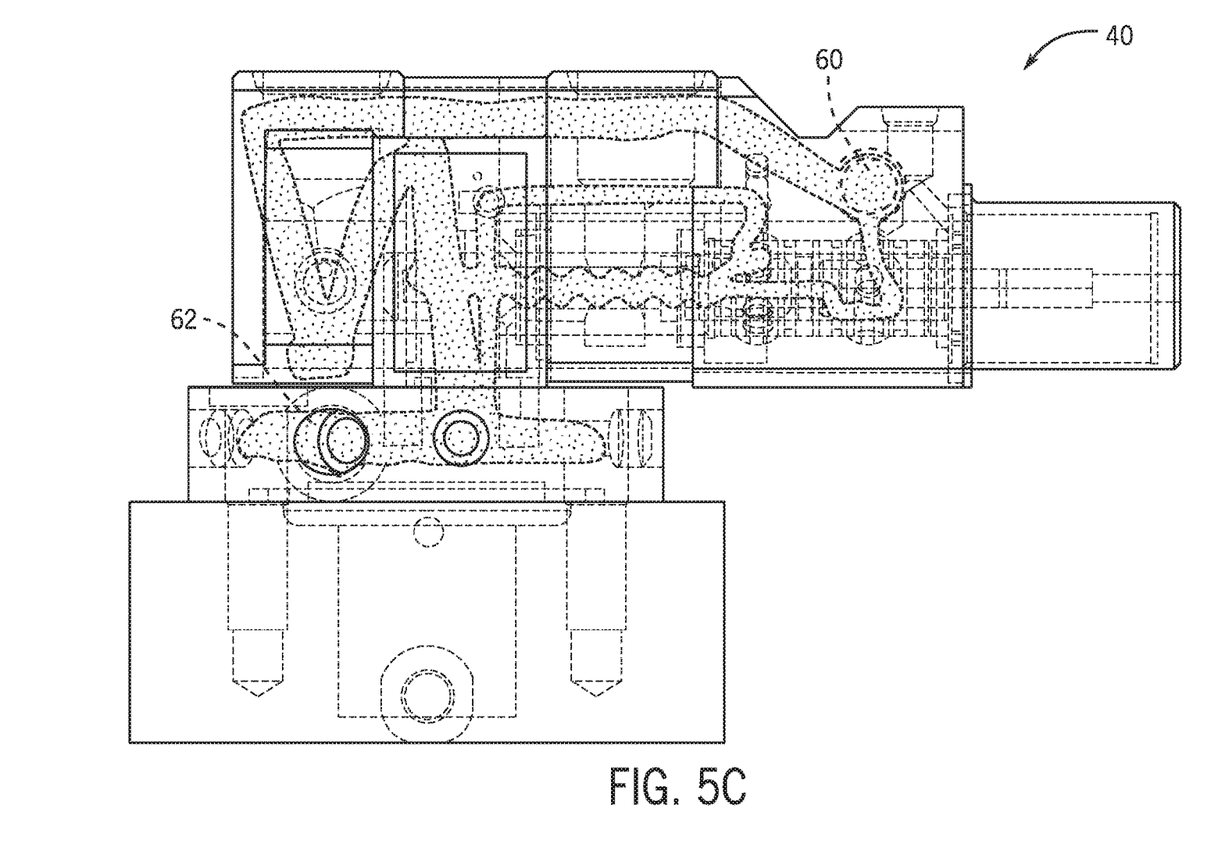

The female component 102 may form the valve head 42 and have an internal bore or axially-extending cavity 110 sized to receive the post 104. In particular, the cavity 110 may have a circular cross-section with a diameter sized to maintain abutting relation with the peaks of the outer surface of the post 104. The inner diameter may be slightly larger than the largest outer diameter of the post 104, or it may slightly smaller so as to create an interference fit when the male 100 and female 102 components are united. In any case, when the valve member is assembled, an end of the female component 102 may abut a radial shoulder 112 of the male component 100, which will locate the female component 102 such that there is a gap 114 between the end face 108 of the post 104 and an inner end face 116 of the cavity 110. This gap 114 allows coolant flowing through the flow passage 106 to exit the post 104 and enter the cavity 110, where it will be forced to pass through the valleys of the spiral formed in the post 104, contacting, and thus cooling, both components 100, 102 of the valve member 40. FIGS. 5A-5C illustrate an example flow path through the control valve 8, and in particular, through the valve member 40.

It will be understood that the male/female relationship of the components 100, 102 could be reversed without departing from the spirit and scope of this disclosure. For example, the male component could form the valve head, and the female component could have a varied cross-section (e.g., helical inner surface) to form the coolant flow path within the valve member. Even more, some the features may be formed in both of the components and presented fully only when the components are assembled. As one example, the inner surface of the female component and the outer surface of the male component may both have non-uniform surfaces that combine to form the internal flow passages.

Moreover, while an example cooling arrangement and valve member construction have been described, other configurations may be possible to achieve cooling of the valve member. For example, the coolant flow path inside the valve member may take configurations other than the spiral configuration illustrated, including for example, splines or axial channels spaced about the post, perforations in the post allowing flow to pass from the internal flow passage radially outward to the inside of the female component. Other configurations are also possible within the scope of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A valve with a valve member cooling arrangement, comprising:
   at least one housing having at least one set of working fluid inlet and outlet ports and a valve chamber at least in part disposed within a flow path from the at least one working fluid inlet port to the at least one working fluid outlet port, the at least one housing having at least one set of coolant supply and return ports in communication with an internal coolant chamber in the at least one housing;
   a valve member movably disposed within the valve chamber and having a valve head configured to control flow between the at least one set of working fluid inlet and outlet ports, the valve member having at least one valve member inlet and at least one valve member outlet and defining an internal valve member cooling passage uniting the at least one valve member inlet and outlet ports;
   wherein, during static and dynamic positioning of the valve member, the at least one valve member inlet port is in communication with the at least one coolant supply port by opening to the coolant chamber in the at least one housing and the at least one valve member outlet is in communication with the at least one coolant return port by opening to the coolant chamber in the at least one housing.

2. The valve of claim 1, wherein the valve member has a first part defining a post extending along a stroke axis of the valve member, and wherein the valve member has a second part defining a cavity extending along the stroke axis receiving the post of the first part.

3. The valve of claim 2, wherein the second part defines the valve head, and wherein the valve head defines a spool having an enlarged cross-section.

4. The valve of claim 3, wherein the first part defines the at least one valve member inlet and the second part defines the at least one valve member outlet.

5. The valve of claim 4, wherein the first part defines an inflow passage of the valve member cooling passage running from the at least one valve member inlet through the post to a post opening in communication with the cavity of the second part.

6. The valve of claim 5, wherein at least one of the post and the cavity has a cross-section that varies, at least in part, along the stroke axis so as to define an outflow part of the valve member cooling passage running to the at least one valve member outlet.

7. The valve of claim 6, wherein at least one of the post and the cavity has a spiral groove forming an outflow part of the valve member cooling passage.

8. The valve of claim 7, wherein an outer surface of the post engages an inner surface of the cavity other than at the spiral groove.

9. The valve of claim 8, further including at least one coolant sleeve disposed in the coolant chamber in the at least one housing and at least in part disposed about the valve member, the at least one coolant sleeve having at least one inflow port in communication with the coolant supply port and at least one outflow port in communication with the at least one coolant return port;
   wherein the inflow and outflow ports of the at least one coolant sleeve are separated by at least one seal.

10. The valve of claim 9, wherein there are two of the coolant sleeves disposed along a stroke axis, a first coolant sleeve defining the at least one inflow port and a second coolant sleeve defining the at least one outflow port.

11. The valve of claim 10, wherein each coolant sleeve has opposite end openings receiving the valve member; and
wherein at least one of the first and second coolant sleeves defines a pocket containing the at least one seal which seals against the valve member to isolate the inflow port from the outflow port.

12. The valve of claim 11, further including a second working fluid inlet port;
wherein the first working fluid inlet port is a purge air inlet port and the second working fluid inlet port is a fuel inlet port.

13. The valve of claim 12, further including:
a first annular seal positioned in the valve chamber about the stroke axis in communication with the purge air inlet port; and
a second annular seal positioned in the valve chamber about the stroke axis in communication with the fuel inlet port, the first and second annular seals being spaced apart along the stroke axis a distance at least as long as a dimension of the valve head along the stroke axis;
wherein the valve member is configured to: (i) close the second annular seal while allowing purge air through the first annular seal at a first position along the stroke axis, (ii) close the first annular seal while allowing fuel through the second annular seal at a second position along the stroke axis, (iii) close both the first and second annular seals at a third position between the first and second positions.

14. The valve of claim 13, further including:
a spring biasing the valve member to the first position; and
an actuator piston configured to act on the spring to move the valve member toward the second position when the actuator piston is actuated.

15. A valve with a valve member cooling arrangement, comprising:
at least one housing having at least one set of working fluid inlet and outlet ports and a valve chamber at least in part disposed within a flow path from the at least one working fluid inlet port to the at least one working fluid outlet port, the at least one housing having at least one set of coolant supply and return ports in communication with an internal coolant chamber in the at least one housing;
a valve member movably disposed within the valve chamber and having a valve head configured to control flow between the at least one set of working fluid inlet and outlet ports, wherein the valve member has a first part defining a post extending along a stroke axis of the valve member and a second part defining a cavity extending along the stroke axis receiving the post of the first part, wherein the first part defines a first part of a valve member cooling passage running from at least one valve member inlet port of the valve member through the post to a post opening in communication with the cavity of the second part, wherein at least one of the post and the cavity has a cross-section that varies, at least in part, along the stroke axis so as to define a second part of the valve member cooling passage running to at least one valve member outlet of the valve member;
wherein, during static and dynamic positioning of the valve member, the at least one valve member inlet port is in communication with the coolant supply port by opening to the coolant chamber in the at least one housing and the at least one valve member outlet is in communication with the at least one coolant return port by opening to the coolant chamber in the at least one housing.

16. The valve of claim 15, further including at least one coolant sleeve disposed in the at least one housing and at least in part disposed about the valve member, the at least one coolant sleeve having at least one inflow port and at least one outflow port separated by at least one seal;
wherein the at least one valve member inlet is in communication with the at least one inflow port of the at least one coolant sleeve and the at least one valve member outlet is in communication with the at least one outflow port of the at least one coolant sleeve.

17. A valve with a valve member cooling arrangement, comprising:
at least one housing having at least one set of working fluid inlet and outlet ports and a valve chamber at least in part disposed within a flow path from the at least one working fluid inlet port to the at least one working fluid outlet port, the at least one housing having at least one set of coolant supply and return ports;
a valve member movably disposed within the valve chamber along a stroke axis and having a valve head configured to control flow between the at least one set of working fluid inlet and outlet ports, the valve member having at least one valve member inlet and at least one valve member outlet and defining an internal valve member cooling passage uniting the at least one valve member inlet and outlet ports;
an inlet coolant sleeve disposed in the at least one housing having an opening about the stroke axis receiving the valve member and having at least one inflow port;
an outlet coolant sleeve disposed in the at least one housing along the stroke axis proximate to the inlet coolant sleeve having an opening about with the stroke axis receiving the valve member and having at least one outflow port; and
an annular seal disposed about the stroke axis to seat against the valve member and isolate the at least one inflow port from the at least one outflow port.

18. The valve of claim 17, wherein the valve member has a first part defining a post extending along a stroke axis of the valve member and a second part defining a cavity extending along the stroke axis receiving the post of the first part.

19. The valve of claim 18, wherein the first part defines a first part of the valve member cooling passage running from the at least one valve member inlet through the post to a post opening in communication with the cavity of the second part.

20. The valve of claim 19, wherein at least one of the post and the cavity has a cross-section that varies, at least in part, along the stroke axis so as to define a second part of the valve member cooling passage running to the at least one valve member outlet.

* * * * *